(12) United States Patent
Huang et al.

(10) Patent No.: US 8,601,318 B2
(45) Date of Patent: Dec. 3, 2013

(54) METHOD, APPARATUS AND COMPUTER PROGRAM PRODUCT FOR RULE-BASED DIRECTED PROBLEM RESOLUTION FOR SERVERS WITH SCALABLE PROACTIVE MONITORING

(75) Inventors: Hai Huang, White Plains, NY (US);
Raymond B. Jennings, III, Ossining, NY (US); Yaoping Ruan, White Plains, NY (US); Debanjan Saha, Mohegan Lake, NY (US); Ramendra K. Sahoo, Mohegan Lake, NY (US); Sambit Sahu, Hopewell Junction, NY (US); Anees Shaikh, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 875 days.

(21) Appl. No.: 11/925,077

(22) Filed: Oct. 26, 2007

(65) Prior Publication Data
US 2009/0113243 A1 Apr. 30, 2009

(51) Int. Cl.
*G06F 11/00* (2006.01)
*G06F 11/07* (2006.01)

(52) U.S. Cl.
USPC ............................... 714/26; 714/40; 709/227

(58) Field of Classification Search
USPC .............. 714/4, 24, 26, 31, 43; 709/227, 228
See application file for complete search history.

(56) References Cited

U.S. PATENT DOCUMENTS

| | | | | |
|---|---|---|---|---|
| 5,107,497 A | * | 4/1992 | Lirov et al. ...................... | 714/26 |
| 5,475,813 A | * | 12/1995 | Cieslak et al. ..................... | 714/4 |
| 5,568,491 A | * | 10/1996 | Beal et al. ..................... | 714/746 |
| 5,819,028 A | * | 10/1998 | Manghirmalani et al. ...... | 714/57 |
| 5,923,854 A | * | 7/1999 | Bell et al. ...................... | 709/243 |
| 5,960,170 A | * | 9/1999 | Chen et al. ...................... | 714/38 |
| 6,006,016 A | * | 12/1999 | Faigon et al. .................... | 714/48 |
| 6,629,269 B1 | * | 9/2003 | Kahkoska ........................ | 714/43 |
| 6,639,900 B1 | * | 10/2003 | Anstey et al. ................. | 370/254 |
| 6,742,141 B1 | * | 5/2004 | Miller ............................. | 714/26 |
| 7,146,536 B2 | * | 12/2006 | Bingham et al. ................ | 714/26 |
| 7,167,998 B2 | | 1/2007 | Brodie et al. ..................... | 714/4 |
| 7,509,229 B1 | * | 3/2009 | Wen ............................. | 702/179 |
| 7,814,542 B1 | * | 10/2010 | Day ............................... | 726/22 |
| 2004/0133689 A1 | * | 7/2004 | Vasisht ......................... | 709/228 |
| 2004/0193896 A1 | * | 9/2004 | Kaneko ......................... | 713/188 |
| 2005/0235058 A1 | * | 10/2005 | Rackus et al. ................ | 709/224 |
| 2006/0036893 A1 | * | 2/2006 | Anglin et al. ...................... | 714/4 |
| 2007/0240019 A1 | * | 10/2007 | Brady et al. .................... | 714/43 |

OTHER PUBLICATIONS

Wikipedia's Network Switch version from Oct. 22, 2007 http://en.wikipedia.org/w/index.php?title=Network_switch&oldid=166331897.*

* cited by examiner

*Primary Examiner* — Joseph Schell
(74) *Attorney, Agent, or Firm* — Harrington & Smith

(57) ABSTRACT

Method, apparatus and computer program product are configured to perform computer monitoring activities; to collect information regarding computer system status during the computer monitoring activities; to detect a problem in dependence on the information collected during the computer monitoring activities; and to determine whether to launch a diagnostic probe when the problem is detected. The monitoring activities may be performed on a periodic or event-driven basis. The determination whether to launch a diagnostic probe is based on a rule included in a hierarchy of rules. The hierarchy of rules is based on problem tickets; system logs; and computer system configuration information.

20 Claims, 5 Drawing Sheets

<result>
        <key> INTERFACE </KEY>
        <value> eth1 </value>
    </result>
    <result>
        <key> ERRORS </key>
        <value> 0 </value>
    </result>
    <result>
        <key> DROPPED </key>
        <value> 0 </value
    </result>
    <result>
        <key> COLLISIONS </key>
        <value> 50234 </value>
    </result>

```
<rule rulename="chk_interface">
  <node probename="chk_eth" id="0">
    <condition> COLLISIONS > 500 </condition>
    <true-branch> id="1" </true-branch>
  </node>
  <node probename="chk_switch" id="1">
    <condition> MANUFACTURER == LINKSYS &&
                MODEL == ETHERFAST &&
                FIRMWARE VERSION <= 2.3.1
    </condition>
    <true-branch>
      alert("upgrade firmware")
    </true-branch>
    <false-branch> id="2" </false-branch>
  </node>
  <node ...>
  :
</rule>
```

301

METHOD, APPARATUS AND COMPUTER PROGRAM PRODUCT FOR RULE-BASED DIRECTED PROBLEM RESOLUTION FOR SERVERS WITH SCALABLE PROACTIVE MONITORING

TECHNICAL FIELD

The invention generally concerns monitoring of computer systems, and more particularly concerns monitoring computer systems using both periodic and event-driven probes, wherein the event-driven probes may be triggered by data gathered from periodic probes.

BACKGROUND

Problem determination for computing systems is a complex process through which computer problems are reported, diagnosed and solved. A typical sequence is for a problem monitoring system. The process continues with basic diagnosis by first level support personnel based on documented procedures. Simple issues such as password reset or file restoration can often be resolved without progressing further. For problems needing further investigation, they are then passed on to more skilled personnel such as system administrators otherwise known as SA's.

When solving computing system problems, administrators often consult monitoring tools that provide some specific system indicators as well as physically access the problematic system to collect additional detailed information using system utilities. Since there are generally few problem determination tools available on most systems, SA's rely on system commands or small scripts in order to obtain system details that are related to the problem cause. In the course of day-to-day problem management, this process is often the most time consuming and expensive task for SA's because it requires field experience and expert knowledge in diagnosing problems.

In addition to the limitation of tool availability, many SA's write their own homegrown tools for monitoring system status and collecting system details. Knowledge used for determining the root cause of various problems is not shared among various SA's in a centralized database of problems and root causes.

Thus there is a need in the art for a method and apparatus for rule based directed problem resolution.

SUMMARY OF THE INVENTION

A first embodiment of the invention is a computer monitoring system comprising a memory storing a computer program, the computer program configured to perform computer system monitoring activities when executed; and a data processing apparatus configured to execute the computer program, wherein when the computer program is executed the computer monitoring system is configured to perform computer monitoring activities; to collect information regarding computer system status during the computer monitoring activities; to detect a problem in dependence on the information collected during the computer monitoring activities; and to determine whether to launch a diagnostic probe when the problem is detected.

A second embodiment of the invention is a computer program product comprising a computer readable memory medium storing a computer program, the computer program configured to be executed by digital processing apparatus, wherein when executed, the computer program is configured to cause a computer system to perform periodic computer monitoring activities; to collect information regarding computer system status during the periodic computer monitoring activities; to determine whether an event-driven probe has been triggered in dependence on the information collected during the periodic computer monitoring activities; and if an event-driven probe has been triggered, to perform the event-driven probe of the computer system.

A third embodiment of the invention is a computer-implemented method comprising: performing monitoring activities of a computer system; collecting information regarding computer system status during the monitoring activities; detecting a problem in dependence on the information collected during the computer monitoring activities; and determining whether to launch a diagnostic probe when the problem is detected.

In conclusion, the foregoing summary of the various embodiments of the present invention is exemplary and non-limiting. For example, one or ordinary skill in the art will understand that one or more aspects or steps from one embodiment can be combined with one or more aspects or steps from another embodiment to create a new embodiment within the scope of the present invention.

BRIEF DESCRIPTION OF THE DRAWINGS

The foregoing and other aspects of these teachings are made more evident in the following Detailed Description of the Invention, when read in conjunction with the attached Drawing Figures, wherein:

FIG. 2 is probe in XML format configured in accordance with the invention;

FIG. 3 is a rule associated with the probe depicted in FIG. 2, the rule configured in accordance with the invention;

DETAILED DESCRIPTION OF THE INVENTION

One embodiment of the invention addresses system problem determination by providing health indicators and automated problem diagnosis capabilities. In one embodiment a multi-level approach is used that provides high-level health monitoring of key subsystems, and scoped probing that collects additional details in an on-demand, rule-based fashion. This method has the advantage of performing detailed drill-down probing only when it is relevant to the problem at hand and avoids the overhead of collecting such data continuously. In addition, the rules are not determined arbitrarily; they are created based on prior knowledge including problem tickets, individual experiences and design documents. The problem determination process is captured into a decision-rule tree whose execution is triggered by high-level monitoring events and launching low-level scoped probing.

The system is encapsulated in an infrastructure which allows users of the system to customize, author and share monitoring tools, items to be monitored and problem resolution rules.

In one embodiment, the present invention is a method and apparatus for rule-based directed problem resolution. The method combines high-level health monitoring of key subsystems and scoped probing that collects additional system details. In a typical situation a two-step determination process is involved. The first step is to monitor a pre-defined set of sub-systems to provide a health view at either periodic intervals or based on event-triggers. The second step is to launch diagnostic probes when a problem is detected from the first step.

Figure 1:
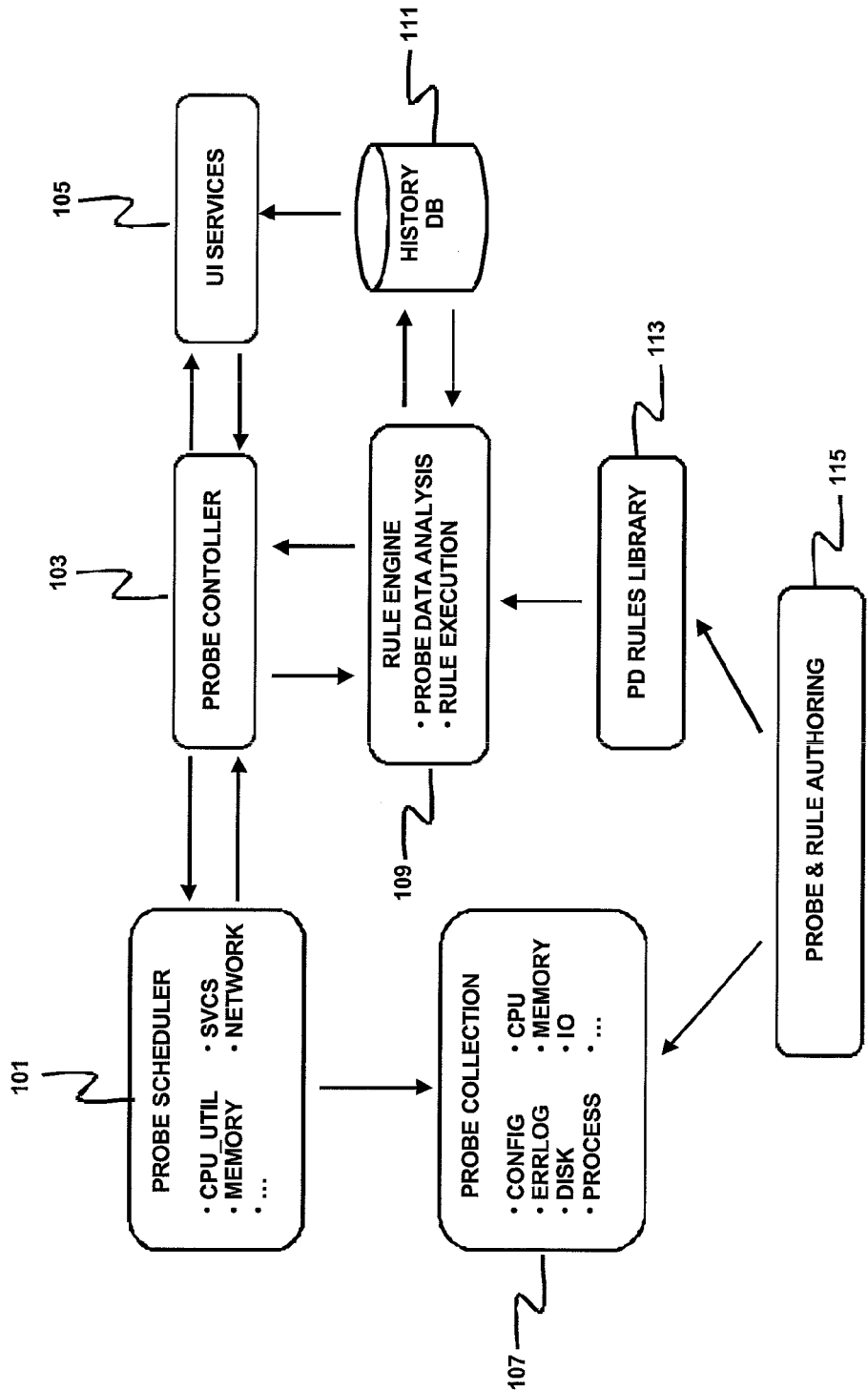
FIG. 1 is a block diagram depicting a computer monitoring system configured in accordance with the invention.

Referring now to FIG. 1, FIG. 1 depicts a block diagram of the overall system. 101 is the probe scheduler module and 107 is shown as the probe collection module. An instance of 101 and 107 would typically reside on each managed server and run as a daemon like process. Element 101 schedules the execution of probes according to a frequency rate or a triggered by an external event.

Block 103 is shown as the probe controller and 109 is the rule engine. Both 103 and 109 would typically reside on each PDA monitoring server. Most of the information exchange and processing is handled by the probe controller 103 and the rule engine 109. Periodically the probe controller 103 receives probe results from the probe scheduler 101. A rule will be triggered if there is a corresponding rule for the particular probe. The rule engine 109 parses rules from the rule library 113 and compares the entry level probe results between the one defined in the rule and the one reported by the probe controller 103. The triggering condition can be a threshold violation, change in a key configuration file, or other detected problem. As the rule tree is traversed, a command is sent to the probe scheduler 101 to execute the diagnostic probe and the result is returned and evaluated for further steps of diagnostic probes.

The probe collection 107 contains one or more probes usually implemented as a script such as Perl, shell etc. that either executes native commands available in the system or interfaces with other monitoring tools deployed in the environment. Each probe parses and aggregates the output of the commands and returns the results in an organized format.

The probe and rule authoring module is shown as 115. This module allows for a user to create their own probes and corresponding rules.

The user interface module is shown as 105 which provides for a way of users of the system to see various aspects including alerts, probes, rules and previous results that are saved in the history database 111.

FIG. 2 shows an example output 201 from a probe in XML format. In this example the output is for a probe that monitors an Ethernet interface. The output 201 can be any data format.

FIG. 3 shows an example rule 301 which is associated with the probe that monitors an Ethernet interface. The first step within the rule tests if the number of collisions is beyond a certain threshold. If the threshold is exceeded, the next probe, chk_switch, is executed to collect some information about the network switch, for example related to the firmware version.

Figure 4:
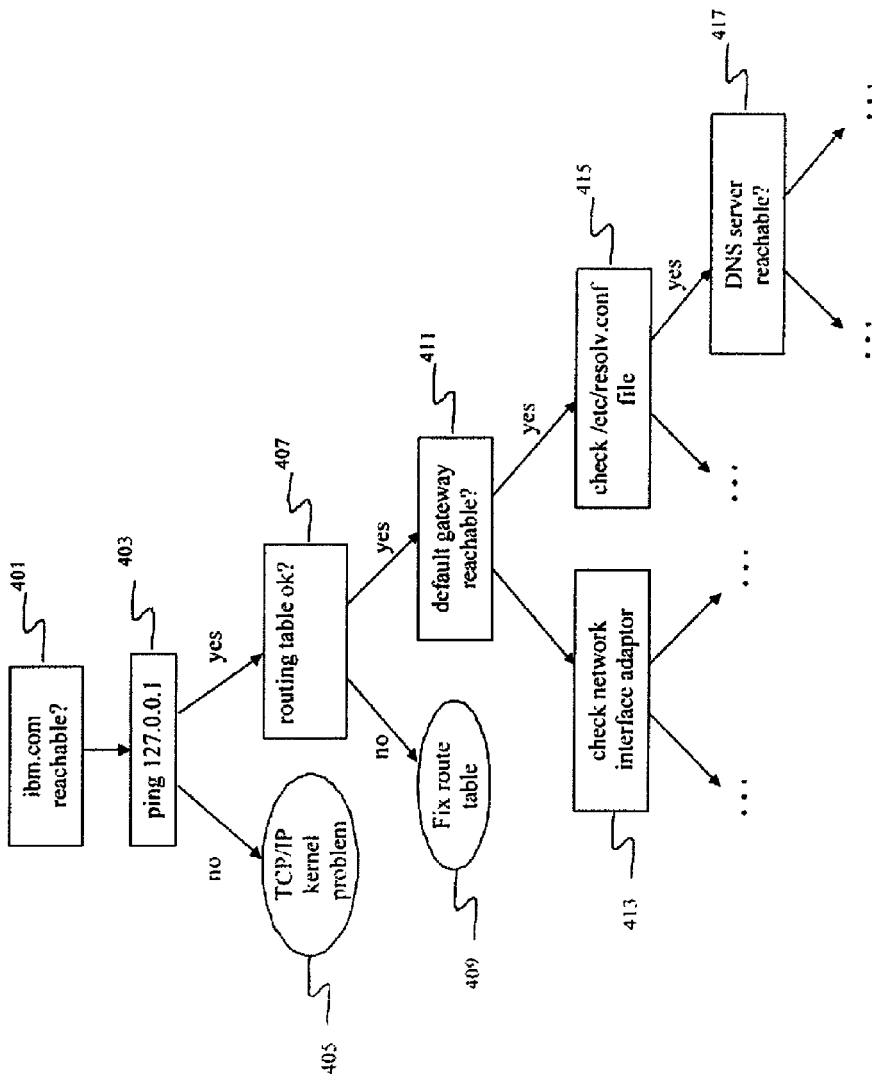
FIG. 4 depicts a tree graph configured in accordance with the invention.

FIG. 4 shows a sample rule tree graph which can diagnose problems related to the network connectivity of a managed server. The process starts at 401. At 403 a test is made to see if the local interface is accessible by running a utility like a ping. If the test at 403 is unsuccessful the process ends at 405 where the TCP/IP configuration should be setup. If 403 is successful the next test performed is 407 which tests if the routing table is valid. If 407 is not successful the process ends at 409. If the test is successful the next test is performed at 411 which tests if the default gateway is reachable. If the test 411 is unsuccessful the next test is to check the network interface adapter 413. If the test at 413 is successful the next time is to check the resolv.conf file 415. If 415 is successful the next test is to determine if the DNS server is reachable at 417.

The rule tree graph shown in FIG. 4 is typically represented by a binary tree with each non-leaf node (403, 407, 411, 413, 415, 417) having two possible outcomes; success or failure. The process ends anytime a leaf node is reached (405, 409). It can be seen by those skilled in the art that any type of tree or graph representation is possible with each node allowing for more than two outcomes.

Clearly some diagnostic probes have dependencies and may to be executed in a certain order. For example, to check that the system file /etc/resolv.conf exists before checking that a DNS server is reachable. In the absence of dependencies, probe could be ordered differently, perhaps tailored to the likelihood of certain types of failures in a given environment.

Figure 5:
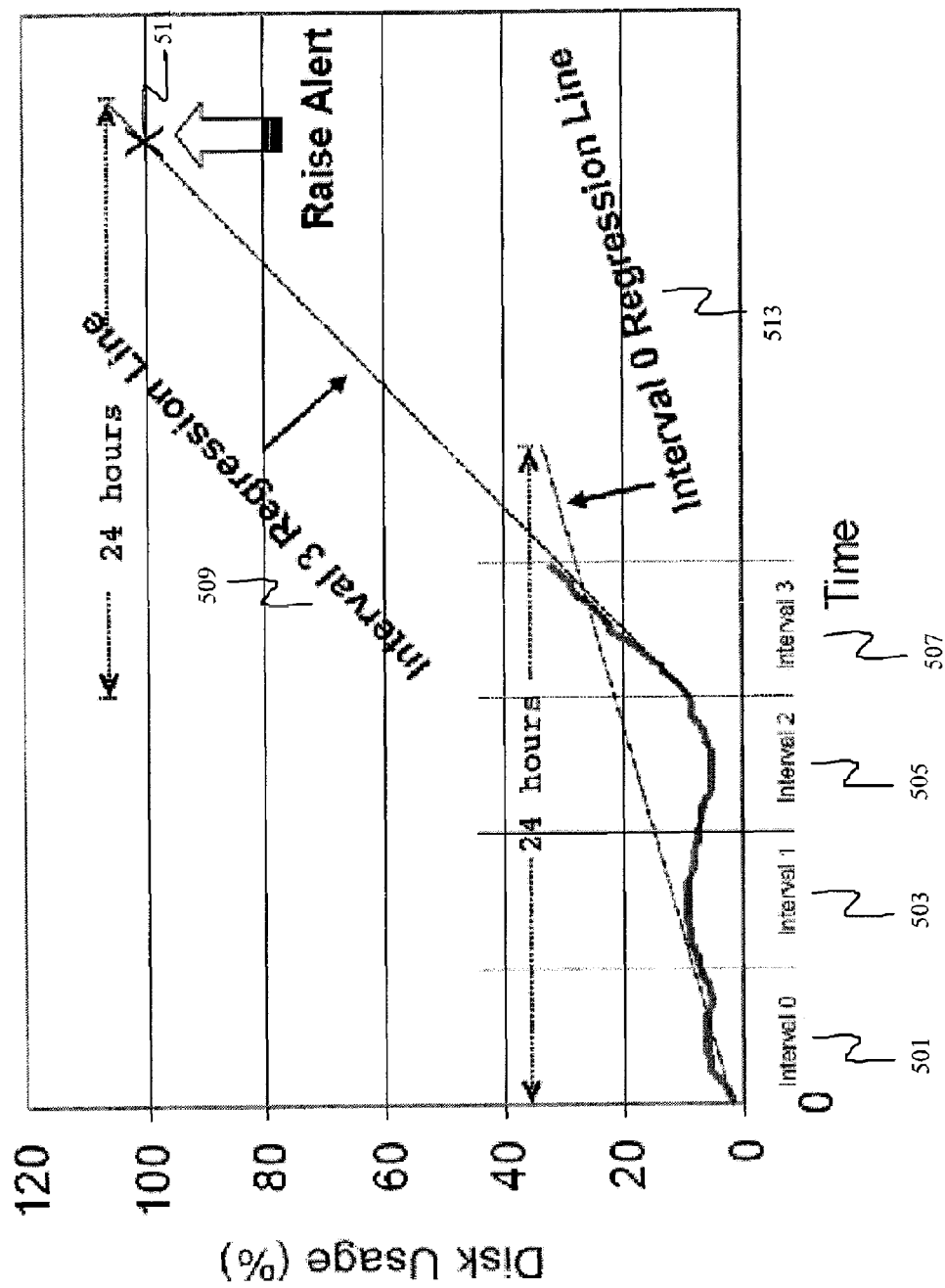
FIG. 5 depicts a sample rule in accordance with the invention.

FIG. 5 shows a sample rule using a profiler to find storage capacity problems. This type of rule is needed in situations when setting up a single threshold is not sufficient. Some number of discrete samples are taken during each interval 501, 503, 505, 507. When the system disk will be full depends both on the current utilization of the space and the speed at which the space is utilized. A simple linear regression model is used to predict the trending. Within interval 507 the rate at which disk space is being used 509 is high enough to raise an alert 511 at some time in the future. Within interval 501 the rate of disk usage 513 is not sufficient to raise an alert. More complex methods can be used to further suppress false alarms.

Various exemplary embodiments in accordance with this invention provide methods, apparatus and computer program products configured to perform computer monitoring activities; to collect information regarding computer system status during the computer monitoring activities; to detect a problem in dependence on the information collected during the computer monitoring activities; and to determine whether to launch a diagnostic probe when the problem is detected. The monitoring activities may be performed on a periodic or event-driven basis. The determination whether to launch a diagnostic probe is based on a rule included in a hierarchy of rules. The hierarchy of rules is based on problem tickets; system logs; and computer system configuration information.

An exemplary embodiment in accordance with this invention is a computer monitoring system which includes a memory storing a computer program. The computer program is configured to perform computer system monitoring activities when executed. The computer monitoring system also includes a data processing apparatus configured to execute the computer program. When the computer program is executed the computer monitoring system is configured to perform computer monitoring activities; to collect information regarding computer system status during the computer monitoring activities; to detect a problem in dependence on the information collected during the computer monitoring activities; and to determine whether to launch a diagnostic probe when the problem is detected.

In a further exemplary embodiment of the computer monitoring system above, the determination whether to launch a diagnostic probe is based on a rule. The rule may be part of a hierarchy of rules that together determine when to launch a diagnostic probe. The hierarchy of rules may be based on problem tickets generated during computer operation, system data logs and/or computer system configuration information.

In another exemplary embodiment of the computer monitoring system above, when the computer program is executed the computer system is further configured to implement an interactive system for specifying a rule-based hierarchy for determining when to launch a diagnostic probe.

Thus it is seen that the foregoing description has provided by way of exemplary and non-limiting examples a full and informative description of the best apparatus and methods presently contemplated by the inventors for implementing rule-based directed problem resolution for servers with scalable proactive monitoring. One skilled in the art will appreciate that the various embodiments described herein can be practiced individually; in combination with one or more other embodiments described herein; or in combination with methods and apparatus differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

We claim:

1. A computer monitoring system comprising: a memory storing a computer program, the computer program configured to perform computer system monitoring activities when executed; and a data processing apparatus configured to execute the computer program, wherein the executed computer program causes the computer monitoring system:
to perform computer monitoring activities;
to collect information regarding computer system status during the computer monitoring activities;
to detect a problem based on the information collected during the computer monitoring activities, wherein detecting the problem further comprises determining whether a number of collisions at an interface is beyond a certain threshold; and
to determine whether to launch a first diagnostic probe from a server based on a first rule of a hierarchy of rules in response to the problem being detected,
where the first diagnostic probe is launched in order to collect diagnostic information regarding the problem detected;
to receive first diagnostic information from the first diagnostic probe; and
to determine whether to launch a second diagnostic probe corresponding to a second rule of the hierarchy based on the first diagnostic information collected from the first diagnostic probe, where the first rule is higher in the hierarchy than the second rule;
where the first diagnostic probe determines whether a local interface is accessible;
where, in response to the local interface being accessible, a determination is made to launch the second diagnostic probe;
where the second diagnostic probe determines whether a routing table is valid;
where the executed computer program further causes the computer monitoring system:
in response to the local interface not being accessible, to set up a TCP/IP configuration;
in response to the routing table being valid, to launch a third diagnostic probe, where the third diagnostic probe determines whether a default gateway is reachable;
in response to the default gateway not being reachable, to launch a fourth diagnostic probe, where the fourth diagnostic probe checks a network interface adapter;
in response to the default gateway being reachable, to launch a fifth diagnostic probe, where the fifth diagnostic probe determines whether a configuration file exists; and
in response to the configuration file existing, to launch a sixth diagnostic probe, where the sixth diagnostic probe determines whether a DNS server is reachable.

2. The computer monitoring system of claim 1 wherein the computer monitoring activities are performed on an event-driven basis.

3. The computer monitoring system of claim 1 wherein the rules of the hierarchy have dependencies such that execution of a plurality of the rules of the hierarchy is only performed in a predefined order.

4. The computer monitoring system of claim 3 wherein the rules of the hierarchy are based on problem tickets generated during computer operation.

5. The computer monitoring system of claim 3 wherein the rules of the hierarchy are based on system data logs.

6. The computer monitoring system of claim 3 wherein the rules of the hierarchy are based on computer system configuration information.

7. The computer monitoring system of claim 3, in which at least one of the dependencies is based on a likelihood of a certain failure type in the monitored activities.

8. The computer monitoring system of claim 3, in which the diagnostic information collected from each of the diagnostic probes consists of success or failure of the corresponding rule, and the second diagnostic probe is launched on condition of the first diagnostic information consisting of success.

9. The computer monitoring system of claim 1 wherein detecting the problem further comprises detecting a change in a key configuration file.

10. The computer monitoring system of claim 1 wherein the executed computer program further causes the computer monitoring system to implement an interactive system for specifying the computer monitoring activities.

11. The computer monitoring system of claim 1 wherein the executed computer program further causes the computer monitoring system to implement an interactive system for specifying a rule-based hierarchy for determining when to launch a diagnostic probe.

12. The computer monitoring system of claim 1 wherein the executed computer program further causes the computer monitoring system to resolve the problem using the diagnostic information collected by the first diagnostic probe.

13. The computer monitoring system of claim 1 wherein, in response to detecting that the number of collisions at the interface is greater than the certain threshold, a diagnostic probe is launched to collect information regarding a network switch.

14. A computer readable memory medium storing a computer program, the computer program configured to be executed by digital processing apparatus, wherein when executed, the computer program is configured to cause a computer system:
to perform periodic computer monitoring activities;
to collect information regarding computer system status during the periodic computer monitoring activities;
to determine whether a first diagnostic probe has been triggered based on the information collected during the periodic computer monitoring activities based on a first rule of a hierarchy of rules, wherein determining whether the first diagnostic probe has been triggered further comprises detecting a threshold violation at an Ethernet interface; and
in response to an event-driven probe being triggered, to launch a first diagnostic probe of the computer system,
where the first diagnostic probe is launched in order to collect diagnostic information regarding a problem detected;
to receive first diagnostic information from the first diagnostic probe; and
to determine whether to launch a second diagnostic probe corresponding to a second rule of the hierarchy based on the first diagnostic information collected from the first diagnostic probe, where the first rule is higher in the hierarchy than the second rule;
where the first diagnostic probe determines whether a local interface is accessible;
where, in response to the local interface being accessible, a determination is made to launch the second diagnostic probe;
where the second diagnostic probe determines whether a routing table is valid;
where the computer program further causes the computer system:
in response to the local interface not being accessible, to set up a TCP/IP configuration;
in response to the routing table being valid, to launch a third diagnostic probe, where the third diagnostic probe determines whether a default gateway is reachable;
in response to the default gateway not being reachable, to launch a fourth diagnostic probe, where the fourth diagnostic probe checks a network interface adapter;
in response to the default gateway being reachable, to launch a fifth diagnostic probe, where the fifth diagnostic probe determines whether a configuration file exists; and
in response to the configuration file existing, to launch a sixth diagnostic probe, where the sixth diagnostic probe determines whether a DNS server is reachable.

15. The computer-readable memory medium of claim 14, wherein the rules of the hierarchy have dependencies such that execution of a plurality of the rules of the hierarchy is only performed in a predefined order.

16. The computer-readable memory medium of claim 15, in which at least one of the dependencies varies with a likelihood of a certain failure type in the monitored activities.

17. A computer-implemented method comprising:
performing monitoring activities of a computer system;
collecting information regarding computer system status during the monitoring activities;
detecting a problem in dependence on the information collected during the computer monitoring activities, wherein detecting the problem further comprises determining whether a number of collisions at an interface is beyond a certain threshold; and
determining whether to launch a first diagnostic probe from a server based on a first rule of a hierarchy of rules in response to the problem being detected,
where the first diagnostic probe is launched in order to collect diagnostic information regarding the problem detected;
receiving first diagnostic information from the first diagnostic probe; and
determining whether to launch a second diagnostic probe corresponding to a second rule of the hierarchy based on the first diagnostic information collected from the first diagnostic probe, where the first rule is higher in the hierarchy than the second rule;
where the first diagnostic probe determines whether a local interface is accessible;
where, in response to the local interface being accessible, a determination is made to launch the second diagnostic probe;
where the second diagnostic probe determines whether a routing table is valid;
where the method further comprises:
in response to the local interface not being accessible, setting up a TCP/IP configuration;
in response to the routing table being valid, launching a third diagnostic probe, where the third diagnostic probe determines whether a default gateway is reachable;
in response to the default gateway not being reachable, launching a fourth diagnostic probe, where the fourth diagnostic probe checks a network interface adapter;
in response to the default gateway being reachable, launching a fifth diagnostic probe, where the fifth diagnostic probe determines whether a configuration file exists; and
in response to the configuration file existing, launching a sixth diagnostic probe, where the sixth diagnostic probe determines whether a DNS server is reachable.

18. The computer-implemented method of claim 17 wherein the monitoring activities are performed on an event-driven basis.

19. The computer-implemented method of claim 17, wherein the rules of the hierarchy have dependencies such that execution of a plurality of the rules of the hierarchy is only performed in a predefined order.

20. The computer-implemented method of claim 19, in which at least one of the dependencies varies with a likelihood of a certain failure type in the monitored activities.

* * * * *